United States Patent [19]

Nara et al.

[11] Patent Number: 4,626,687
[45] Date of Patent: Dec. 2, 1986

[54] INFRARED SENSOR

[75] Inventors: Motohisa Nara; Yasushi Endo, both of Fukushima, Japan

[73] Assignee: Kureha Kagaku Kogyo Kabushiki Kaisha, Tokyo, Japan

[21] Appl. No.: 678,360

[22] Filed: Dec. 5, 1984

[30] Foreign Application Priority Data

Dec. 9, 1983 [JP] Japan ................... 58-232593

[51] Int. Cl.[4] ................... G01J 5/06; G01J 5/04
[52] U.S. Cl. ................... 250/338; 250/370
[58] Field of Search ................... 250/338 PY, 338 SE, 250/338 FE, 370 R, 370 F, 370 K, 338 R

[56] References Cited

U.S. PATENT DOCUMENTS 4,152,595 5/1979 Garfinkel et al. ................... 307/350
4,258,259 3/1981 Obara et al. ................... 250/338

FOREIGN PATENT DOCUMENTS 2919936 11/1980 Fed. Rep. of Germany ... 250/338 R

OTHER PUBLICATIONS

Anon., "Passive Intruder Alarm Using a Triglycine Sulphate Infra-red Detector", *The SERT Journal*, vol. 5 (Mar. 1971), pp. 34–35.

*Primary Examiner*—Janice A. Howell
*Assistant Examiner*—Constantine Hannaher
*Attorney, Agent, or Firm*—Woodcock Washburn Kurtz Mackiewicz & Norris

[57] ABSTRACT

In an infrared sensor having a pyroelectric element and a FET in a high frequency electric field and infrared radiation shielding case, a capacitor is located in the case and connected to at least one of the drain and source electrodes of the FET in order to remove an influence due to an external high-frequency electric field.

5 Claims, 17 Drawing Figures

INFRARED SENSOR

BACKGROUND OF THE INVENTION

1. Field of the Invention

The present invention relates to an infrared sensor having a pyroelectric element and a field-effect transistor (FET).

2. Description of the Prior Art

Figure 1:
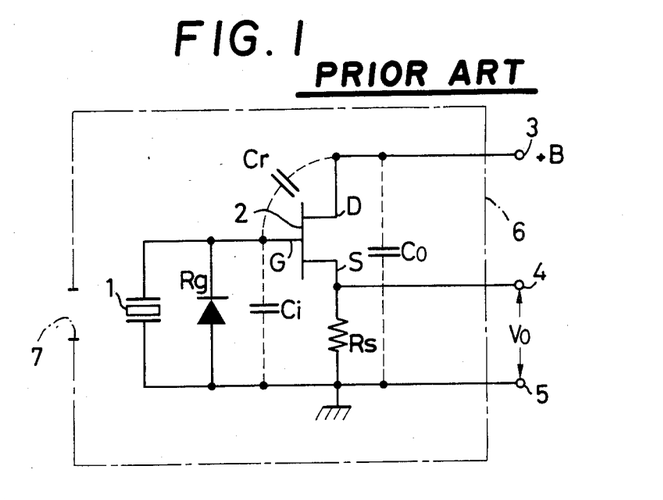
FIG. 1 is a circuit diagram showing conventional infrared sensor.

An infrared sensor shown in FIG. 1 is conventionally known. In FIG. 1, reference numeral 1 denotes a pyroelectric element having pyroelectric effect; and 2, a field-effect transistor (FET) having drain, source and gate electrodes D, S and G. A diode Rg is used as a gate resistor, and a resistor Rs is used as a source resistor. Reference numeral 3 denotes a power supply terminal for supplying a power supply voltage +B to the drain electrode D; 4, an output terminal for producing a detection voltage $V_0$ from the source electrode S; and 5, a grounding terminal.

According to the above configuration, a gate potential changes slightly in accordance with a change of infrared radiations detected by the pyroelectric element 1, thereby changing a drain current of the FET 2. Thus, when the drain current flows in the source resistor Rs, the detection voltage $V_0$ can be obtained between the terminals 4 and 5.

In such an infrared sensor, a circuit shown in FIG. 1 is enclosed by a shielding case 6. The terminals 3, 4 and 5 are led out of the shielding case 6 with lead wires, respectively. These lead wires have an inductance with respect to high-frequency components. For this reason, if a strong high-frequency electric field, for example, due to radio communication in the UHF band is generated near the circuit, an electromotive force is easily induced in the lead wires. Meanwhile, a feedback capacitance Cr indicated by a dotted line in FIG. 1 is formed between the drain and gate electrodes D and G of the FET 2. In addition, a diode is formed by a p-n junction between the gate and source electrodes G and S of the FET 2. For this reason, a high-frequency current due to a voltage induced in the terminal 3 flows into the gate electrode G through the feedback capacitor Cr, and is detected by the above-mentioned diode. As a result, the detected low-frequency component is superposed on the detection voltage $V_0$, or is output as the detection voltage $V_0$ itself.

Furthermore, input and output capacitances Ci and Co are respectively formed between the gate electrode G of the FET 2 and ground and the drain electrode D and ground as indicated by dotted lines in FIG. 1. These capacitances Ci and Co are so small as to have high impedance with respect to high-frequency components. Therefore, this FET 2 may perform high-frequency amplification. When a high-frequency voltage is generated between the lead wires by an external high-frequency electric field, the potential thereof directly acts on the respective electrodes of the FET 2.

In this manner, the conventional infrared sensor is easily influenced by an external high-frequency electric field, resulting in a detection error.

BRIEF SUMMARY OF THE INVENTION

Accordingly, it is an object of the present invention to provide an infrared sensor which can eliminate the influence of an external high-frequency electric field.

It is another object of the present invention to provide an infrared sensor which can precisely detect only directed infrared radiations.

In order to achieve the above objects, there is provided an infrared sensor comprising an pyroelectric element and a field effect transistor in a shielding case, wherein a capacitor is connected between at least one of drain and source electrodes of said field effect transistor and a ground potential.

Other and further objects of this invention will become obvious upon an understanding of the illustrative embodiments about to be described or will be indicated in the appended claims, and various advantages not referred to herein will occur to one skilled in the art upon employment of the invention in practice.

DETAILED DESCRIPTION OF THE PREFERRED EMBODIMENTS

In the following embodiments, the same reference numerals as in FIG. 1 denote the same parts as that in FIG. 1.

Figure 2:
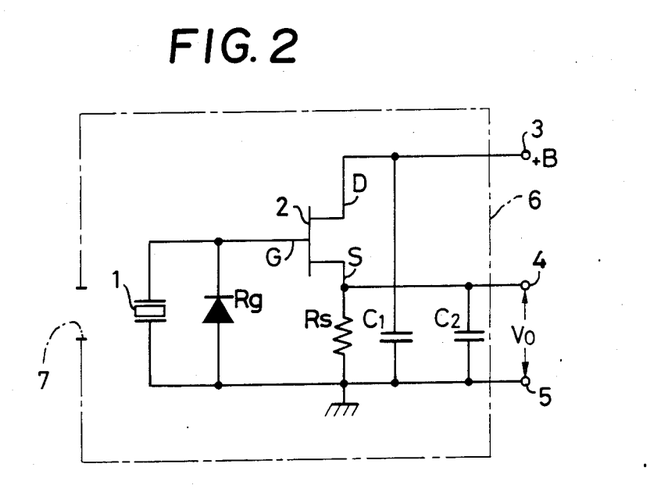
FIG. 2 is a circuit diagram of an infrared sensor according to the first embodiment of the present invention.

The first embodiment of the present invention will be described with reference to FIGS. 2 to 4.

In this embodiment, a capacitor $C_1$ is coupled between the drain electrode D of a FET 2 and ground, and a capacitor $C_2$ is coupled between the source electrode S thereof and ground. The capacitors $C_1$ and $C_2$ have low capacitances so as to have a low impedance with respect to high-frequency components. Therefore, ceramic, mica or styrol may be used for the capacitors $C_1$ and $C_2$, in which the loss in high-frequency band is small. When the size of a shielding case 6 is small, microchip capacitors may be used so that they are disposed in the shielding case 6.

According to the above configuration, even when a high-frequency current occurs in lead wires connected to terminals 3, 4 and 5, this high-frequency current flows to ground through the capacitors $C_1$ and $C_2$. For this reason, the FET 2 is not influenced. Therefore, the detection voltage $V_0$ in accordance with a change of directed infrared radiations can be obtianed between the terminals 4 and 5.

Experimental results which were obtained from a comparison between the infrared sensor according to this embodiment and the conventional one will be described hereinafter.

Figure 5:
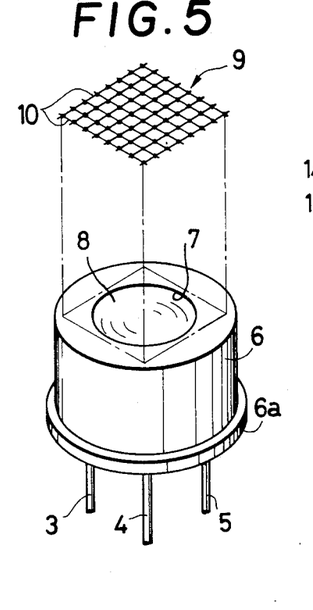
FIG. 5 is an exploded perspective view of an infrared sensor according to the second embodiment of the present invention.

The infrared sensor used in the experiment comprised a cylindrical shielding case 6 same as that shown in FIG. 5. In the shielding case 6, the same circuit as that shown in FIG. 2 consisting of the pyroelectric element 1, the FET 2 and at least one of the chip capacitors $C_1$ and $C_2$ was installed. The power supply terminal 3, the output terminal 4 and the grounding terminal 5 were respectively located on the rear end side of the shielding case 6. A circular detection window 7 was provided at a position opposite to the pyroelectric element 1 on the front surface of the shielding case 6. An optical filter 8, which was formed on silicon or the like, for transmitting infrared rays was mounted on the detection window 7 from inside of the case 6.

An experiment was conducted in such a manner that the terminals 3, 4 and 5 of the above infrared sensor were inserted into sockets provided on a shielding box. In this case, the rear portion 6a of the case 6 and the insertion ports of the socket were spaced apart by about 6 mm so that some parts of the terminals 3, 4 and 5 were exposed. An antenna was arranged in front of the sensor at a distance of 1 m, and transmitted a high-frequency radio wave of about 903 MHz to 905 MHz. In addition, experimental conditions included the state where the window 7 was open (the state where the optical filter 8 was mounted) and the state where the window 7 was closed (the state where the window 7 was convered by a blind cap).

Figure 3:
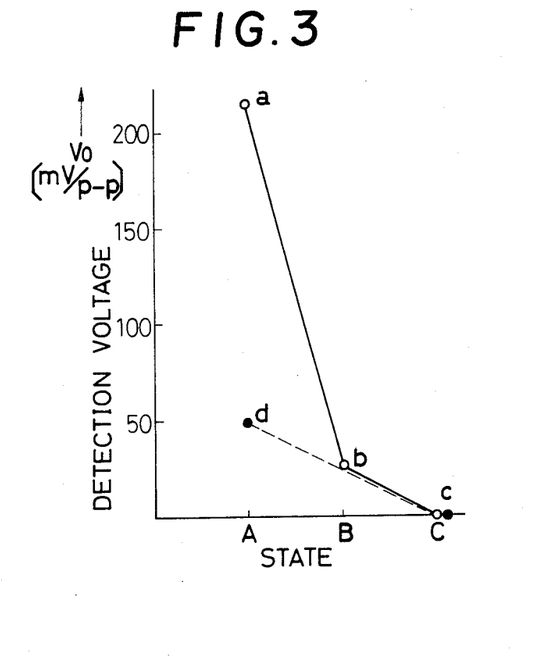
FIG. 3 is a graph showing experimental data of the infrared sensor of FIG. 2.

FIGS. 3 and 4 respectively show experimental data. In FIG. 3, the detection voltage $V_0$ obtained between the terminals 4 and 5 is plotted along the ordinate, and three states A, B and C of the experiment are plotted along the abscissa. The state A represents the state where the capacitors $C_1$ and $C_2$ are not used, i.e., the conventional circuit in FIG. 1. The state B respresents the state where only the capacitor $C_1$ in FIG. 2 is used and the capacitor $C_2$ is omitted. The state C represents the state where both capacitors $C_1$ and $C_2$ are used. The capacitors $C_1$ and $C_2$ were connected to the terminals 3, 4 and 5 in the shielding box.

Data at points a, b and c in FIG. 3 were obtained in the state where the window 7 was open. On the other hand, data at point d was obtained in the state where the window 7 was closed. FIGS. 4A to 4D show waveforms of the detection voltages $V_0$ obtained at the points a, b, c and d, respectively.

Figure 4A:
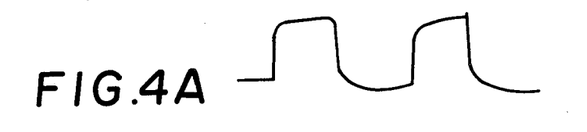
FIGS. 4A to 4E are waveform charts of a detection voltage corresponding to the experimental data of FIG. 3.
Figure 4B:
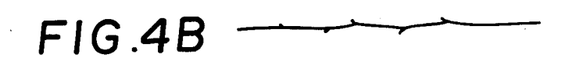
Figures 4C, 4D:
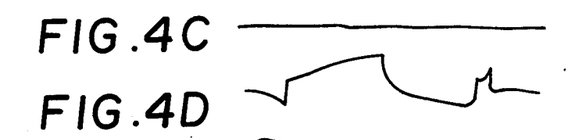
Figure 4E:
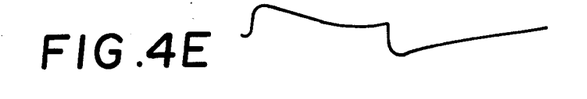

The data of FIG. 4A represents the case when a high-frequency radio wave was intermittently transmitted from the antenna. It is found that the detection voltage $V_0$ is considerably influenced by the high-frequency radio wave. This influence can be reduced by using the capacitor $C_1$ as shown by the data of FIG. 4B. Furthermore, the influence due to the high-frequency radio wave can be completely removed by using the capacitors $C_1$ and $C_2$ as shown by the data of FIG. 4C. The wave form of the detection voltage $V_0$ shown in FIG. 4E respresents the data obtained when a human hand was waved in front of the sensor in the state where capacitors $C_1$ and $C_2$ were used. As is apparent from this, the sensor detects only a change of the directed infrared radiations. When the window 7 of the case 6 is closed, the detection voltage $V_0$ is considerably influenced by the high-frequency radio wave as shown by the data of FIG. 4D. When the capacitors $C_1$ and $C_2$ are used, however the influence due to the high-frequency radio wave can be removed as shown by the data at the point c. It is confirmed that (although data is not shown) when only the capacitor $C_2$ is used, the similar result to that in the case when only the capacitor $C_1$ is used is obtained.

As described above, according to the first embodiment, since the capacitors $C_1$ and $C_2$ for passing the high-frequency current are connected to the drain electrode D and/or the source electrode S of the FET 2, the influence of radio communication in the UHF band can be effectively removed. Note that the similar effect with respect to radio waves having other wavelengths such as VHF band, HF band and the like can be obtained by changing the capacitances of the capacitors $C_1$ and $C_2$.

In the above configuration of the first embodiment, however, the influence due to a microwave of, for example, 3 GHz of more cannot be removed. Such a microwave is used in a speed detector for a ball, a vehicle or the like and a door sensor for controlling the opening and closing of an automatic door. Particularly, when the above infrared sensor is used as an intrusion detector, it may be arranged adjacent to the door sensor and the influence due to microwaves is therefore considerable.

In embodiments to be described hereinafter, the influence of microwaves is also substantially removed.

The second and third embodiments of the present invention will be described with reference to FIGS. 5 to 8.

FIG. 5 shows the second embodiment of the present invention.

In this embodiment, a shielding net 9 is externally mounted on the detection window 7 of the shielding case 6. The shielding net 9 comprises metal wires, for example, copper wires 10 of about 0.05 to 0.1 mm$\phi$ formed in a net. Intersections of the copper wires 10 are electrically connected to each other by bonding or soldering. A mesh size of the shielding net 9 is about 1 mm $\times$ 1 mm.

The shielding net 9 is mounted on the front surface of the shielding case 6 by soldering, Dotite (tradename) mounting, bonding or the like. Therefore, each portion of the shielding net 9 has substantially the same potential (ground potential) as that of the shielding case 6, and has a good shielding effect (about $-20$ dB) with respect to microwaves. Although the detection voltage $V_0$ of the infrared radiations decreases by about 30%, this is negligible in practice.

Figure 6A:
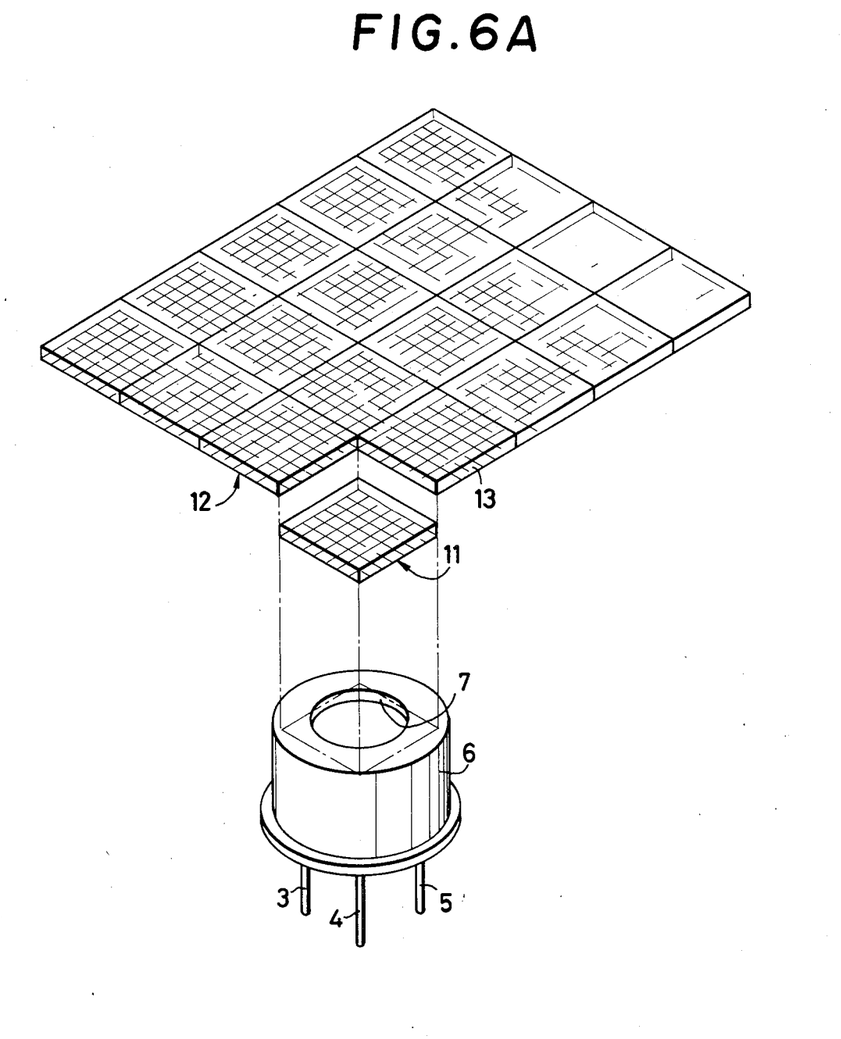
FIGS. 6A and 6B are respectively an exploded perspective view and a longitudinal sectional view of an infrared sensor according to the third embodiment of the present invention.
Figure 6B:
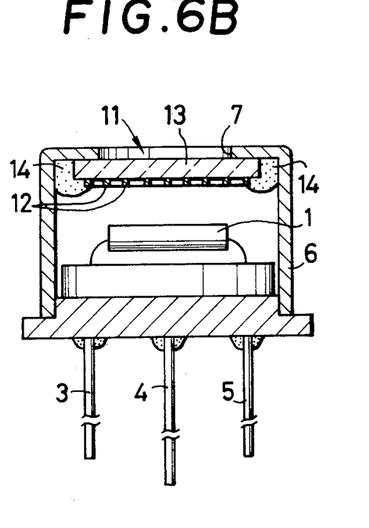

FIGS. 6A and 6B show the third embodiment of the present invention.

In this embodiment, an optical filter 11 for transmitting the infrared rays is mounted on the detection window 7 of the shielding case 6, and a thin metal film 12 is deposited on the filter 11 so as to form a net pattern. Silicon, sapphire, germanium, NaCl, KCl or the like can be used as the base material of the optical filter 11. A metal which preferably has a low resistivity such as Ni, Al, Cr and the like can be used as the metal to be deposited on the filter 11, and Au can be preferably used if the cost is not a problem.

The deposition pattern can be changed in accordance with the pattern of the deposition mask. In order to obtain the effect according to the present invention, however, the pitch of the lines of the net pattern (the width of respective meshes) is preferably within the range between about 0.5 and 2.5 mm, the width of the respective lines is preferably within the range between about 0.01 and 1 mm, and the thickness of the line (the thickness of the deposition film) is preferably within the range between about 0.05 and 1 micron. These conditions ensure that more infrared rays can be transmitted through the detection window 7 while microwaves are effectively shielded therefrom.

When the above optical filter 11 for transmitting the infrared rays is manufactured, a plurality of optical filters 11 are manufactured at the same time and are preferably divided to obtain a single optical filter 11 with a view towards low cost. In other words, a thin metal film 12 is deposited into a net pattern on a base material 13 having checkerboard-pattern grooves corresponding to each size of filters 11 and thereafter, this is cut along the grooves.

The obtained optical filter 11 is internally mounted on the detection window 7 which is formed on the front surface of the shielding case 6. In this case, in order to protect the deposition surface of the filter, the metal deposition surface of the optical filter 11 is directed inside the case 6, and the thin metal film 12 and the shielding case 6 are fixed to each other by, for example, Dotite mounting 14 so that they are conductive to each other. In this manner, each portion of the thin metal film 12 has substantially the same potential (ground potential) as that of the shielding case 6, and has a good shielding effect (e.g., about −9 to −15 dB) with respect to microwaves. Although the detection voltage $V_0$ of the infrared radiations decreased by about 30%, this is negligible in practice.

Figure 7:
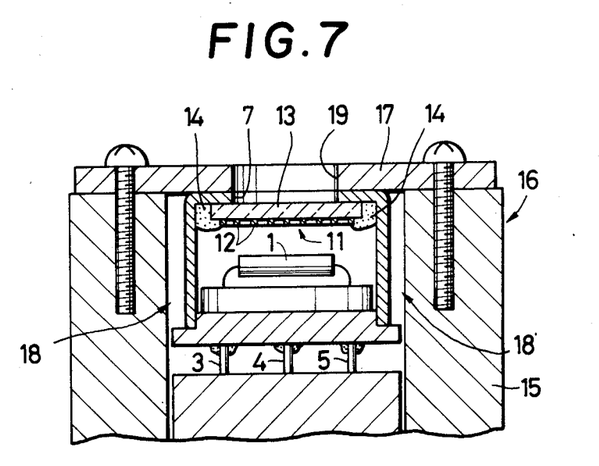
FIG. 7 is a partial longitudinal sectional view of a system including the infrared sensor according to the third embodiment.

FIG. 7 shows a preferable application of the infrared sensor according to this embodiment.

In FIG. 7, reference numeral 15 denotes a shielding box formed of Al or the like. The shielding box 15 encloses a power supply unit, preamplifier, and the like. The infrared sensor is mounted so as to be enclosed in a cylindrical socket 16 provided on the front surface of the shielding box 15. A grounding plate 17 made of, for example, copper is fixed by screws at the front end face of the cylindrical socket 16. The grounding plate 17 is provided so as to be in electrical contact with the front surface of the shielding case 6. The gap 18 between the shielding case 6 of the infrared sensor and the inner surface of the cylindrical socket 16 of the shielding box 15 is completely closed by the grounding plate 17. A detection hole 19 is formed at the center of the grounding plate 17 so as to correspond to the detection window 7 of the infrared sensor.

According to this configuration, the shielding box 15, the shielding case 6 of the infrared sensor and the net pattern 12 of the optical filter 11 have substantially the same potential, and microwaves intruding through the gap 18 can be completely shielded. As a result, as will be apparent from experiments to be described later, a better microwave shielding effect (e.g., about −40 to −50 dB) can be obtained.

Experiments according to the second and third embodiments will be described hereinafter.

The experiments were conducted in such manners that the infrared sensors were inserted and mounted in the shielding box 15 as shown in FIG. 7 and microwaves of frequency f=10.525 GHz were transmitted in front of the sensor from a distance of 10 cm.

Figure 8:
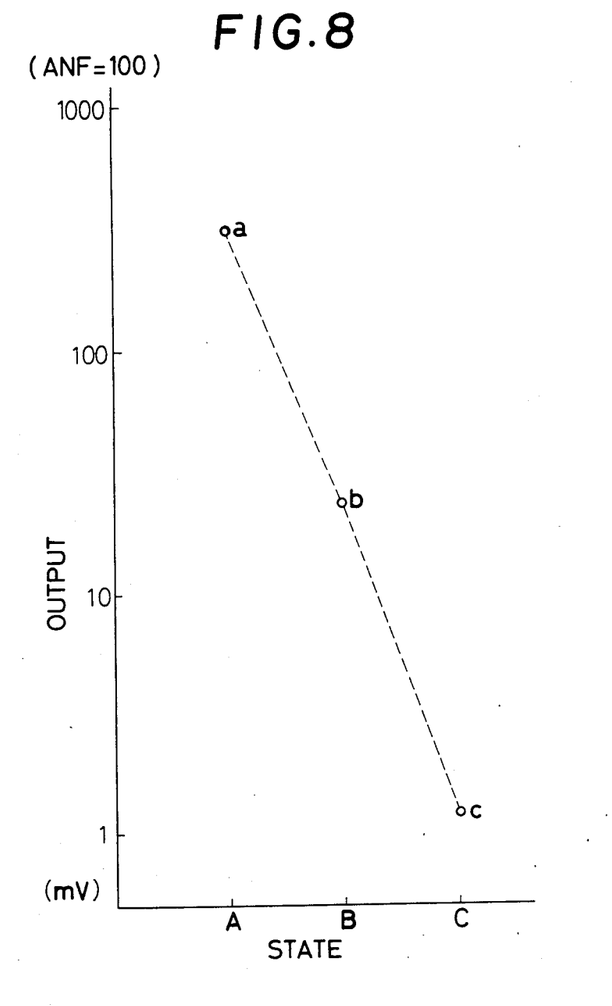
FIG. 8 is a graph showing experimental data according to the second embodiment.

FIG. 8 is a graph showing a result of the above experiments. In this graph, reference symbol A denotes a conventional state where neither a net member or a front end grounding means are used in the infrared sensor; B, a state where the shielding net 9 formed of copper shown in FIG. 5 is fixed to the detection window of the infrared sensor by using Dotite mounting; and C, a state where the grounding means 17 made of a copper plate shown in FIG. 7 is mounted on the front end portion of the infrared sensor in addition to the shielding net 9. A polyvinylidene fluoride resin was used for the pyroelectric element 1, and chip capacitors $C_1$ and $C_2$ of 27 pF were used. A sensor output (mV/P-P) represented by a logarithmic scale is plotted along the ordinate.

As is apparent from this result, in the state A where no processing was performed, an output of about 304 mV/P-P due to the microwaves was recorded. In the state B where the shielding net according to the second embodiment was provided, however, the output was descreased to about 24 mV/P-P (about −22 dB). Furthermore, in the state C where the front end grounding was provided, the output further decreased to about 1.196 mV/P-P (about −48.1 dB).

On the other hand, in the infrared sensor having the deposition net shown in FIGS. 6A and 6B (where the pyroelectric element 1 made of polyvinylidene fluoride resin, the chip capacitors $C_1$ and $C_2$ of 100 pF, and the base material 13 of the optical filter 11 formed of a silicon plate of 10μ thickness were used), the following results were obtained.

The infrared sensor in which no shielding was provided produced an output of about 136 mV/P-P. The infrared sensor with an aluminum deposited net, however, produced an output of about 67.2 mV/P-P (about −6.1 dB). In the same manner, while the sensor with no net produced an output of about 27.2 mV/P-P, the sensor with the nickel deposited net produced an output of about 8.795 mV/P-P (about −9.8 dB). In another experiment in which the sensor with the nickel deposited net was tested, the output was lowered by about −15 dB.

On the other hand, while the detection output $V_0$ of the infrared radiations was about 675μV/P-P in the sensor having no nickel deposited net (where chip capacitors $C_1$ and $C_2$ of 47 pF were used), the sensor with the nickel deposited will be described with reference to FIGS. 9 to 12.

Figure 9:
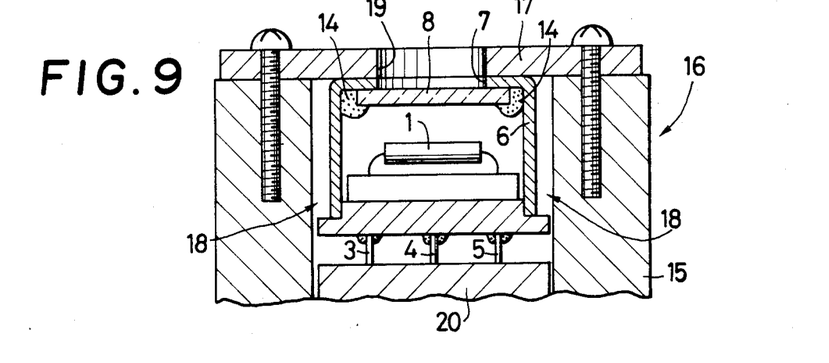
FIG. 9 is a partial longitudinal sectional view of a shielding device according to the fourth embodiment of the present invention.

FIG. 9 shows the fourth embodiment of the present invention. In this embodiment, an infrared sensor having an optical filter 8 for transmitting the infrared rays, which is formed of, for example, silicon, and is mounted on a detection window 7 inside a shielding case 6. The infrared sensor is enclosed in the similar shielding box 15 to that in FIG. 7. The pyroelectric element 1 is connected to the same circuit as in FIG. 2 comprising chip capacitors $C_1$ and $C_2$. Reference numeral 20 denotes a connector provided in a cylindrical socket 16 of the shielding box 15. A grounding plate 17 is fixed at the front end face of the socket 16.

According to this configuration, the shielding case 6 of the infrared sensor has the same potential (ground potential) as that of the shielding box 15, and the FET provided in the shielding case 6 is effectively shielded. The gap 18 formed between the cylindrical socket 16 and the shielding case 6 of the infrared sensor provided in an opening of the socket 16 can be completely closed by the grounding plate 17. For this reason, the microwave which intrudes through the gap 18 and induces an electromotive force in lead wires 3, 4 and 5 can be completely shielded. When the grounding plate 17 in this embodiment is provided, the shielding effect with respect to microwaves can be considerably improved (e.g., about −30 dB).

Figure 10:
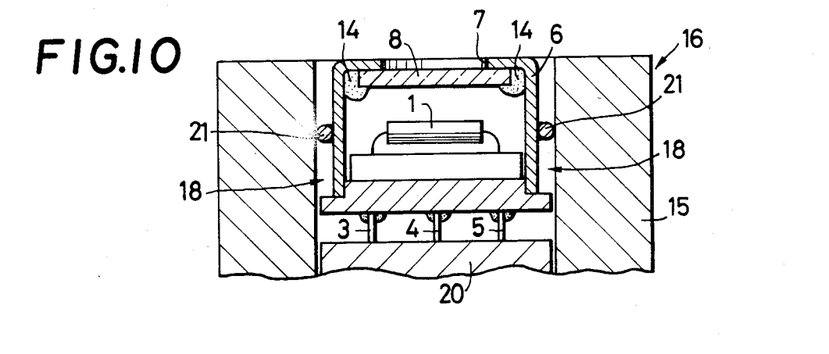
FIG. 10 is a partial longitudinal sectional view of a shielding device according to the fifth embodiment of the present invention.
Figure 11:
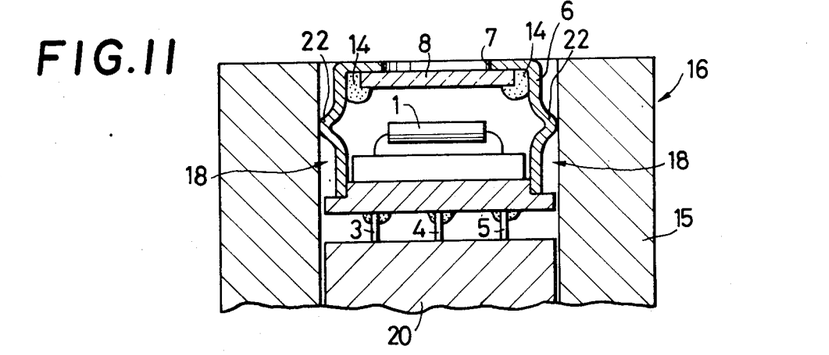
FIG. 11 is a partial longitudinal sectional view of a shielding device according to the sixth embodiment of the present invention.

FIGS. 10 and 11 show the fifth and sixth embodiments of the present invention, respectively.

In the embodiment shown in FIG. 10, a ring-like grounding spacer 21 is provided in the gap 18 between a cylindrical socket 16 and a shielding case 6 of an infrared sensor instead of the grounding plate 17 of FIG. 9. The gap 18 can be completely closed by the spacer 21, and since a shielding box 15 is conductive with the shielding case 6 of the infrared sensor through the spacer 21, they have the same potential (ground potential).

In the embodiment of FIG. 11, an annular grounding projection 22 is formed integrally with an outer surface of a shielding case 6 of an infrared sensor. Since the projection 22 abuts against the inner surface of a cylindrical socket 16, the gap 18 is completely closed, and a shielding box 15 is conductive with the shielding case 6 of the infrared sensor.

In the embodiments shown in FIGS. 10 and 11, the similar microwave shielding effect to that in the fourth embodiment shown in FIG. 9 can be obtained.

Experiments according to the fourth to sixth embodiments will be described hereinafter.

The experiments were performd in such a manner that the infrared sensor was inserted and mounted in the shielding box 15 shown in FIG. 9 and microwaves of frequency f=10.525 GHz were transmitted in front of the sensor from a distance of 10 cm.

Figure 12:
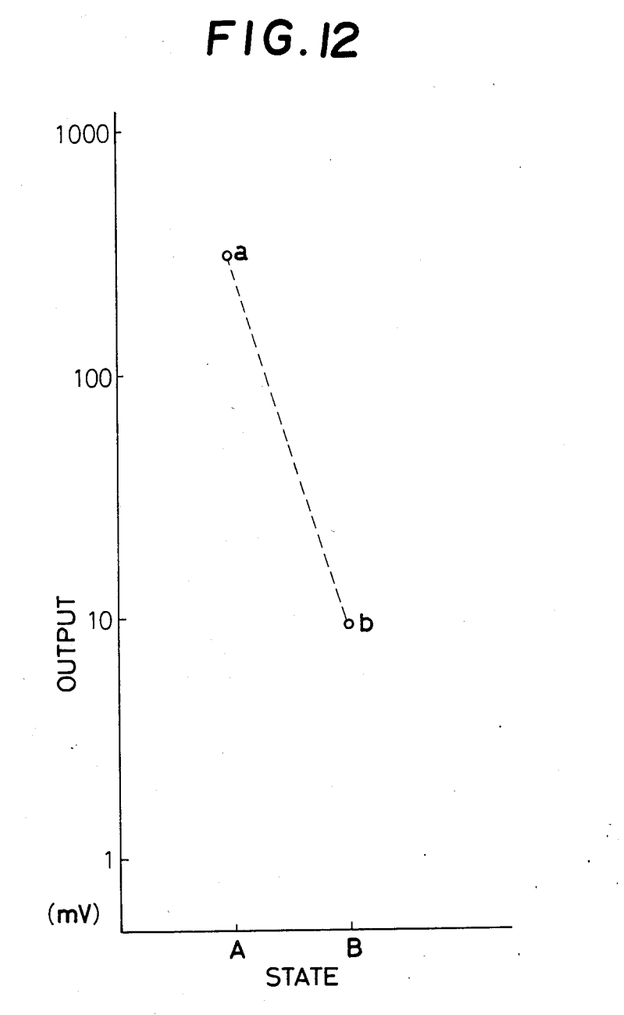
FIG. 12 is a graph showing experimental data according to the fourth embodiment.

The obtained results are shown in FIG. 12. In this graph, reference symbol A denotes a conventional state where no grounding means is used in the infrared sensor; and B, a state where the grounding means 17 made of a copper plate shown in FIG. 9 is mounted on the front end portion of the infrared sensor. A polyvinyldiene fluoride resin was used for the pyroelectric element 1, and chip capacitors $C_1$ and $C_2$ of 27 pF were used. A sensor output (mV/P-P) represented by a logarithmic scale is plotted along the ordinate.

As is apparent from these results, in the state A where no shielding was provided, an output of 304 mV/P-P was obtained. In the state B using the grounding means 17 according to the fourth embodiment, however this level improved to about 9.198 mV/P-P (about −30.4 dB).

When the grounding means as described above is provided between the shielding case of the infrared sensor and the external shielding casing, as in the fourth to sixth embodiments, the infrared sensor can be satisfactorily fixed and held at a predetermined position in the opening of the external shielding casing.

What is claimed is:

1. An infrared sensor comprising a pyroelectric element and a field effect transistor having drain, source and gate electrodes in a high frequency electric field and infrared radiation shielding case, the gate electrode being coupled with the pyroelectric element, wherein a capacitor is located in the case and connected between at least one of said drain and source electrodes of said field effect transistor and a ground potential.

2. An infrared sensor according to claim 1, wherein a second capacitor is located in said case and connected between the remaining one of said drain and source electrodes of said field effect transistor and said ground potential.

3. An infrared sensor according to claim 2 wherein said two capacitors have substantially the same capacitance.

4. An infrared sensor according to claim 2, wherein said two capacitors are chip capacitors.

5. An infrared sensor according to claim 1, wherein a chip capacitor is used as said capacitor connected between at least one of drain and source electrodes of said field effect transistor and a ground potential.

* * * * *